US011368550B2

(12) United States Patent
Trapane et al.

(10) Patent No.: US 11,368,550 B2
(45) Date of Patent: Jun. 21, 2022

(54) SYSTEMS AND METHODS FOR ENTITY AWARE ALLOCATION OF ELECTRONIC RESOURCES

(71) Applicant: Raytheon Company, Waltham, MA (US)

(72) Inventors: Karen L. Trapane, Largo, FL (US); Hector L. Irizarry, Richardson, TX (US)

(73) Assignee: Raytheon Company, Waltham, MA (US)

( * ) Notice: Subject to any disclaimer, the term of this patent is extended or adjusted under 35 U.S.C. 154(b) by 57 days.

(21) Appl. No.: 16/879,307

(22) Filed: May 20, 2020

(65) Prior Publication Data

US 2020/0382617 A1  Dec. 3, 2020

Related U.S. Application Data

(60) Provisional application No. 62/856,341, filed on Jun. 3, 2019.

(51) Int. Cl.
| | |
|---|---|
| *G06F 15/16* | (2006.01) |
| *G06F 9/54* | (2006.01) |
| *H04L 29/06* | (2006.01) |
| *H04L 67/63* | (2022.01) |
| *H04L 67/1023* | (2022.01) |

(52) U.S. Cl.
CPC ........ *H04L 67/327* (2013.01); *H04L 67/1023* (2013.01)

(58) Field of Classification Search
CPC .......................... H04L 67/327; H04L 67/1023

USPC ......................................................... 709/226
See application file for complete search history.

(56) References Cited

U.S. PATENT DOCUMENTS

| | | | |
|---|---|---|---|
| 9,577,940 B2* | 2/2017 | Childress | .............. H04L 47/125 |
| 9,602,380 B2* | 3/2017 | Strassner | ............ H04L 43/0888 |
| 9,667,641 B2 | 5/2017 | Muddu et al. | |
| 9,998,511 B2 | 6/2018 | Fox et al. | |
| 10,244,048 B2* | 3/2019 | Hodges | ............... H04L 67/1023 |
| 10,521,284 B2 | 12/2019 | McClory et al. | |
| 2009/0276528 A1* | 11/2009 | Pienta | ..................... G06F 9/505 |
| | | | 709/226 |
| 2013/0238378 A1* | 9/2013 | Connolly | ........... G06Q 30/0205 |
| | | | 705/7.22 |

(Continued)

*Primary Examiner* — Hamza N Algibhah
(74) *Attorney, Agent, or Firm* — Burns & Levinson LLP; Joseph M. Maraia

(57) ABSTRACT

A resource allocation system including one or more resource producers arranged to provide one or more electronic resources and a plurality of consumer devices arranged to receive the one or more electronic resources. The system also includes an environmental sensor arranged to detect and provide environmental data associated with an operational status of a first consumer device. The system includes a context database arranged to store operational context information associated with operations of the plurality of consumer devices. The system further includes a resource controller arranged to determine an allocation of the one or more electronic resources to the plurality of consumer devices that is also arranged to adjust an allocation of the one or more electronic resources to the first consumer device based on the operational context information and the environmental data associated with the operational status of the first consumer device.

19 Claims, 8 Drawing Sheets

(56) References Cited

U.S. PATENT DOCUMENTS

| | | | |
|---|---|---|---|
| 2013/0283289 A1* | 10/2013 | Adinarayan | G06F 9/5094 |
| | | | 718/105 |
| 2015/0281339 A1* | 10/2015 | Strassner | H04L 41/0893 |
| | | | 709/224 |
| 2017/0177808 A1* | 6/2017 | Irwin | G06Q 10/10 |
| 2017/0214737 A1* | 7/2017 | Agarwal | H04L 69/326 |
| 2017/0214738 A1* | 7/2017 | Agarwal | H04L 47/125 |
| 2018/0077078 A1* | 3/2018 | Huang | H04L 29/08 |
| 2018/0146030 A1* | 5/2018 | Weng | H04L 41/0659 |
| 2018/0300199 A1* | 10/2018 | Rathbone | G06F 11/1662 |
| 2018/0316752 A1* | 11/2018 | Hodges | H04L 67/1023 |
| 2020/0167190 A1 | 5/2020 | Bernat | |
| 2020/0174848 A1 | 6/2020 | Kawachiya et al. | |

\* cited by examiner

SYSTEMS AND METHODS FOR ENTITY AWARE ALLOCATION OF ELECTRONIC RESOURCES

REFERENCE TO RELATED APPLICATIONS

This application claims priority to and the benefit of U.S. Provisional Patent Application No. 62/856,341, filed on Jun. 3, 2019, entitled "Client-Aware Resource Load-Balancing (CARLB) for Analytics Ingest," the entire contents of which are incorporated herein by reference.

TECHNICAL FIELD

This application relates generally to allocating electronic resources and, more particularly, to entity aware allocation of electronic resources available to multiple consumers.

BACKGROUND

Existing electronic data systems that provide electronic information often utilize load balancing systems to ensure information providers efficiently handle information requests from multiple consumers. For example, an Internet information provider such as Google® has implemented a massive server farm with load balancers to handle billions of hypertext transport protocol (HTTP) data requests, e.g., search requests, every day. The load balancers monitor the load on the servers and direct data requests to servers in the server farm with available processing capacity. Server farms may be distributed geographically to reduce data traffic latency depending on the location or IP address of client devices. Typical load balancing algorithms used for server selection include round robin, weighted round robin, random, source IP hash, URL hash, least connections, weighted least connections, agent-based adaptive load balancing, weighted response time, layer 7 content switching, active directory group based traffic steering, and Kafka auto load balancing. Some systems use Kafka flow control with topic pausing and Kafka manual performance monitoring for data messaging.

These load balancer and data flow control schemes base their decisions on network, server, or communications bandwidth capacity associated with the information producer, not the consumer or client device requesting the information. Existing load balancers also account for fixed service criteria such as defined by a service level agreement (SLA) or other fixed requirements of consumers when allocating resources to client devices from different servers or producers. Yet, such fixed requirements do not account for possible changes in the needs of consumers or client devices, or changes in the cyber or physical environment in which a consumer or client device operates.

Instead, existing load balancing systems typically account for consumer or client devices and their information needs uniformly. Any fixed criteria often becomes stale over time or as the cyber or physical environment changes. Furthermore, as multiple clients are typically forced to conform to the same SLA, there is no regard for individual client operating states, no consideration for governance of competing client demands, and no prioritization of such client demands. Ultimately, resource utilization is not sufficiently optimized for multiple consumers or client devices accessing producer resources.

SUMMARY

The application, in various implementations, addresses deficiencies associated with allocating resources from producers to multiple consumer or client devices.

This application describes an exemplary scheme for collaborative resource load-balancing based on distributed analytic settings. Entity-aware resource load-balancing systems, devices and methods allocate (i.e., redistribute and/or apportion) computing and/or network capacity according to a remote entity need (e.g., a consumer device and/or client device) and operational priority, effectively reducing waste of computing and/or network capacity and, thereby, improving electronic infrastructure resource utilization while reducing cost such as operating costs on cloud settings and capital investments on physical infrastructure. The present systems, devices and methods enable, for example: use of analytics to perform quota calculations for electronic resources based on operational context, introduce entity "state" and "criticality" as a factor of load balancing and/or electronic resource allocation, and provide an ability to define "criticality" (i.e., operational priority) of a consumer device's needs depending on the consumer and/or client device operational context. Operational context for a consumer/client is the environment that influences its operation and may include military, civil, commercial, enterprise, industrial, or other environments.

In various aspects, the systems, devices, and methods herein enable automated reallocation of a processing priority of a consumer's and/or client's stream data and connection failover in response to the remote data resource producers' state degradation. For instance, in environments where data aggregation is performed by middleware services (e.g., an intermediate server), traditional client-server approaches for failover have reduced effectiveness because end points, such as data resource producers and consumers and/or client devices, are decoupled. When middleware is involved, the health of a communications channel does not provide any implied guarantees on the health of communication endpoints. The systems, devices and method herein may advantageously require endpoints to broadcast health and/or operational status information as part of their heartbeat and/or periodic message to a resource controller and/or endpoint devices.

Data consumers (e.g., consumer and/or client devices) may, in turn, monitor the heartbeats and/or periodic operational status messages of data resource producers and/or middleware resource providers to perform fail over and load balancing decisions. For example, the following events, without limitation, may be considered for failover including: degradation of a communication channel between a consumer device and middleware resource, degradation of a communication channel between a resource producer and middleware resource, degradation of the health and/or operational status of a resource producer, and degradation of the health and/or operational status of middleware instance and/or resource.

In various aspects, the systems, devices and methods herein extend load balancing (LB) beyond a data stream from middleware to enable scaling to processing and/or producer resources which is applicable to any program using data cloud resources. In some implementations, the systems, devices and methods herein enable automatic load balancing and scaling of processing resources based on operational intent criticality of remote entities (e.g., consumers and/or client devices). For existing systems, auto scaling is typically limited to functions of local resource utilization at the resource producers. For example, if an HTTP web server instance hits 90% CPU utilization, a local load balancer and/or server typically adds one new instance. One of the inventive concepts herein allows for intent-based SLAs where, for example, a user class may have a minimum technical performance measure (TPM) and/or threshold for a particular function and/or service. A system may then monitor remote Key Performance Indicators (KPI) and auto scale to maintain the SLA without a human-in-loop (HIL) or factory refactoring.

Some aspects of the present application enable intent based electronic resource load balancing and allocation including automated scaling of processing infrastructure in response to remote entity SLA KPI degradation. For existing systems, in environments where remote entities and/or clients require a strict time sensitive SLA and a variable load sizing system to enable a maximum amount of load per their requirements, there is typically a high operational cost to maintain warm standbys and factory refactoring based on concept of operations (CONOPS) changes. One approach to the present application addresses this deficiency by defining sizing of electronic systems as functions of remote entities consumers, and/or client KPI, which allows for load balancing and scaling determinations in response to a degradation of quality of service (QoS) as perceived by consumers and/or client devices.

Some approaches of the present application enable remote entities to broadcast KPI telemetry as part of a heartbeat and/or operational status message. An SLA monitor and/or resource controller may trigger actions to improve performance to maintain notionally defined SLAs. An SLA monitor, resource controller, and/or mobile computing device processor may utilize SLA dependency graphs that are maintained via feedback loop on metrics. KPIs may be defined as complex states that remove the need for a threshold trigger from a centralized system. For example, a client device processor may include an SLA monitor trigger action if a key performance indicator, e.g., KPI1, is below a minimum performance threshold, and determine an operational status as being "red." The client device, e.g., a mobile computing device, may report KPI1 as "red" via, for example, an alert message to a resource controller based on its own mission critical needs.

In one aspect, a resource allocation system includes one or more resource producers arranged to provide one or more electronic resources and a plurality of consumer devices arranged to receive the one or more electronic resources. The system also includes a first environmental sensor arranged to detect and provide environmental data associated with an operational status of a first consumer device of the plurality of consumer devices. The system includes a context database arranged to store operational context information associated with operations of the plurality of consumer devices. The system also includes a resource controller arranged to determine an allocation of the one or more electronic resources to the plurality of consumer devices that is further arranged to adjust an allocation of the one or more electronic resources to the first consumer device based on the operational context information and the environmental data associated with the operational status of the first consumer device.

The first consumer device may include a user interface arranged to receive an operational setting from an operator of the first consumer device. The resource controller may adjust the allocation of the one or more electronic resources to the first consumer device based further on the operational setting. The first environment sensor may include a physical environmental sensor or a cyber environmental sensor. The physical environmental sensor may be arranged to detect temperature, moisture, pressure, position, movement, location, orientation, wind velocity, smoke, depth, and/or altitude. The cyber environmental sensor may include a network data monitor, protocol analyzer, virus detector, intrusion detector, firewall, router, network traffic monitor, processor utilization monitor, heartbeat sensor, and/or a network operations center. The system may include a second environmental sensor arranged to detect and provide data associated with an operational status of the one or more resource producers. In one implementation, the resource controller adjusts the allocation of resources from among the one or more resource producers to the first consumer device based further on the operational status of the one or more resource producers. The first environmental sensor may be integrated with the first consumer device. The first environmental sensor may be remote from the first consumer device.

In one configuration, at least one resource producer of the one or more resource producers is configured to periodically send a message to the resource controller indicating an operational status of the resource producer. The system may include a second consumer device, where the first environmental sensor detects and provides environmental data associated with the operational status of the second consumer device. The resource controller may adjust an allocation of the one or more electronic resources to the first consumer device and second consumer device based further on operational context information and an operational status of the second consumer device.

The system may include an intermediate electronic resource arranged to receive the one or more electronic resources from the one or more resource producers and send the one or more electronic resources to the first consumer device. The second environmental sensor may be arranged to detect and provide data associated with an operational status of the intermediate electronic resource. The resource controller may adjust the allocation of resources from among the one or more resource producers to the first consumer device via the intermediate electronic resource based further on the operational status of the intermediate electronic resource.

The one or more electronic resources may include multimedia files, data files, video files, audio files, media streams, audio streams, data streams, data channels, media channels, video channels, audio channels, communications interfaces, communications channels, an information database, a media database, broadcast data, broadcast data bandwidth, communications services, communications channel capacity, an amount of communications channels, communications bandwidth, media data services, producer processing power, and/or intermediate electronic resource processing power. The environmental data may include telemetry data.

In another aspect, a resource allocation server includes a transceiver arranged to: i) receive, from a first environmental sensor, environmental data associated with an operational status of a first consumer device, ii) receive operational context information associated with a plurality of consumer devices including the first consumer device, and iii) send a control message to at least one intermediate server based on a determined allocation of electronic resources to configure an allocation of electronic resources from one or more resource producers to the first consumer device via the at least one intermediate server. The server also includes a resource controller arranged to determine the allocation of the electronic resources to the first consumer device based on the operational context information and the environmental data associated with the operational status of the first consumer device.

In a further aspect, a mobile computing device includes a transceiver arranged to: i) send and receive data communications via a data network and ii) periodically send operational status data to a remote resource controller where the operational status data including at least one of key performance indicators and an alert message. The device also includes a data store arranged to store at least one of service level agreement data and quality of service data associated with the operation of the mobile computing device. The device further includes a processor arranged to: i) monitor the operational status of at least one of the mobile computing device and the operational status of the data network, ii) determine a threshold level of quality of service based on at least one of the service level agreement data and the quality of service data, iii) compare a level of the operational status of at least one of the mobile computing device and the data network with the threshold level of quality of service and, if the level of the operational status is below the threshold level of quality of service, generate the alert message including an indication to the remote resource controller to adjust an allocation of electronic resources to the mobile computing device to alleviate the alert condition.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various aspects, addresses deficiencies associated with allocating resources from resource producers to multiple consumer devices and/or client devices.

This application describes entity-aware resource load-balancing systems, devices and methods that allocate (i.e., redistribute and/or apportion) computing and/or network capacity according to a remote entity need (e.g., a consumer device and/or client device) and operational priority, effectively reducing waste of computing and/or network capacity and, thereby, improving electronic infrastructure resource utilization while reducing costs such as operating costs on cloud settings and capital investments on physical infrastructure. The present systems, devices and methods enable, for example: use of analytics to perform quota calculations for electronic resources based on operational context, introduce entity "state" and "criticality" as a factor of load balancing and/or electronic resource allocation, and provide an ability to define "criticality" (i.e., operational priority) of a consumer device's needs depending on consumer and/or client device operational context. Operational context for a consumer/client is the environment that influences its operation and may include military, civil, commercial, enterprise, industrial, or other environments.

Figure 1:
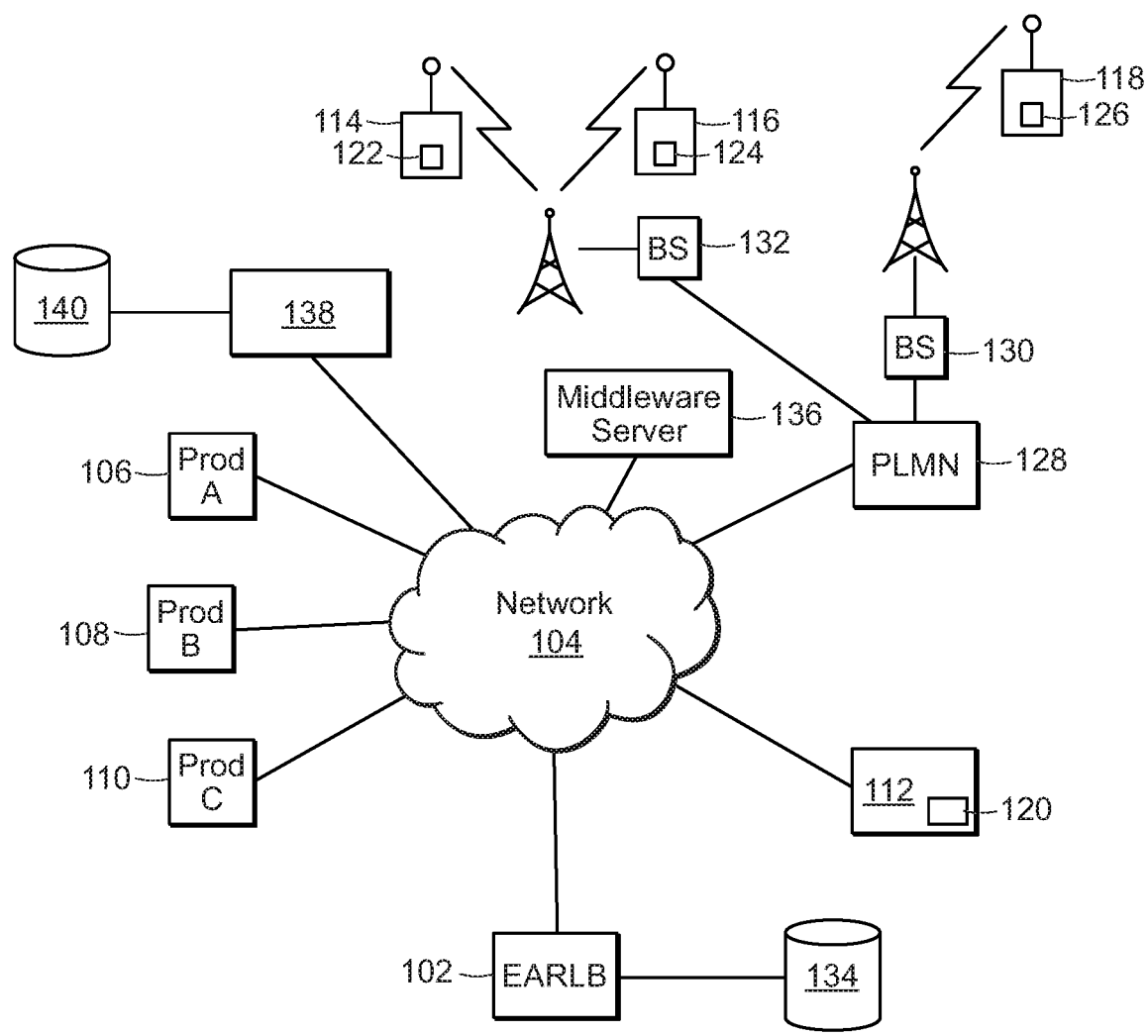
FIG. 1 is a diagram of an exemplary data network including resource producers and consumer devices.

FIG. 1 is a diagram of an exemplary data distribution system 100 including a data network 104, resource producers 106, 108, and 110 and consumer and/or client devices such as personal computer 112 and mobile devices 114, 116, and 118. A resource producer such as resource producers 106, 108, and 110 may include a website, an Internet Service Provider (ISP), government information site, a communications provider, a data service provider, a database, and the like. A resource producer may provide electronic resources at one more OSI layers including, for example, an application via the application layer to a physical interface at the physical layer, and/or a service at any layer in between. Public land mobile network (PLMN) 128 may include a wireless communications network providing wireless services such as, without limitation, 5G, 4G, 3G, LTE, CDMA, GSM, and 802.11 and/or Wifi network services. PLMN 128 may be considered a resource producer capable of adjusting communications services, wireless channel allocations, wireless service features, and/or bandwidth to any of mobile computing devices 114, 116, and 118. Each of consumer devices 112, 114, 116, and 118 may include a consumer software application 120, 122, 124, and 126 respectively that functions as a consumer of electronic resources provided by resource producers including resource producers 106, 108, 110, and/or 128. PLMN 128 may include base stations 130 and 132 that provide wireless communications interfaces with mobile computing devices 114, 116, and 118.

Data distribution system 100 may include an entity-aware load balancing (EARLB) system 102. The EARLB system 102 may include one or more servers. The system 102 may include and/or interface with a database 134. Database 134 may include information such as, without limitation, operational context information and/or an SLA associated with the operations of one or more of the resource consumers 112, 114, 116, and 118. Database 134 may include identity and/or subscription information associated with consumers 112, 114, 116, and 118 to enable authentication and/or authorization of an allocation of resources related to such consumers and/or client devices. Database 134 may store heartbeat and/or operational status information associated with producers 106, 108, 110, and 128 and/or associated with consumer devices 112, 114, 116, and 118. EARLB system 102 may interface with a remote server 138 and/or database 140 to access operational context information and/or operational status information related to producers 106, 108, 110, and 128 or consumer devices 112, 114, 116, and 118.

Data distribution system 100 may include one or more middleware systems or servers such as middleware and/or intermediate server 136. Server 136 may function as an intermediary between one or more resource producers and consumer devices. For example, application 122 in mobile computing device 114 may request access to a web server running on middleware server 132. But, server 132 may retrieve data for the requested webpage from producer 106 that contains a database of the data requested by application 122. Hence, mobile computing device 114 and/or application 122 may not be aware of the health, availability, capacity, and/or operating status of the producer 106 database, unless application 122 receives information regarding the operational status of producer 106. In some implementations, system 102 monitors the operational status of producers 106, 108, 110 and/or 128 and may direct server 136 to shift or fail over from retrieving data from the producer 106 database to an alternative database of producer 108. System 102 may utilize one or more cyber environmental sensors to monitor the operational status of producers 106, 108, 110 and 128. One or more of producers 106, 108, 110, and 128 may internally monitor their operational status and periodically, or in response to an operational event or request from system 102, send operational status messages to system 102, middleware server 136, and/or consumer devices 112, 114, 116, and 118. In some instances, a consumer device 112, 114, 116, and 118, having received operational status information related to one or more resource producers 106, 108, 110, and/or 128, system 102, and/or middleware server 136 may automatically redirect a request for electronic resources to an alternate resource producer or middleware server having an operational status that satisfies its QoS requirements. Further details regarding the operation of an entity-aware resource load-balancing (EARLB) system are provided later herein with respect to FIGS. 3 and 4.

Figure 2:
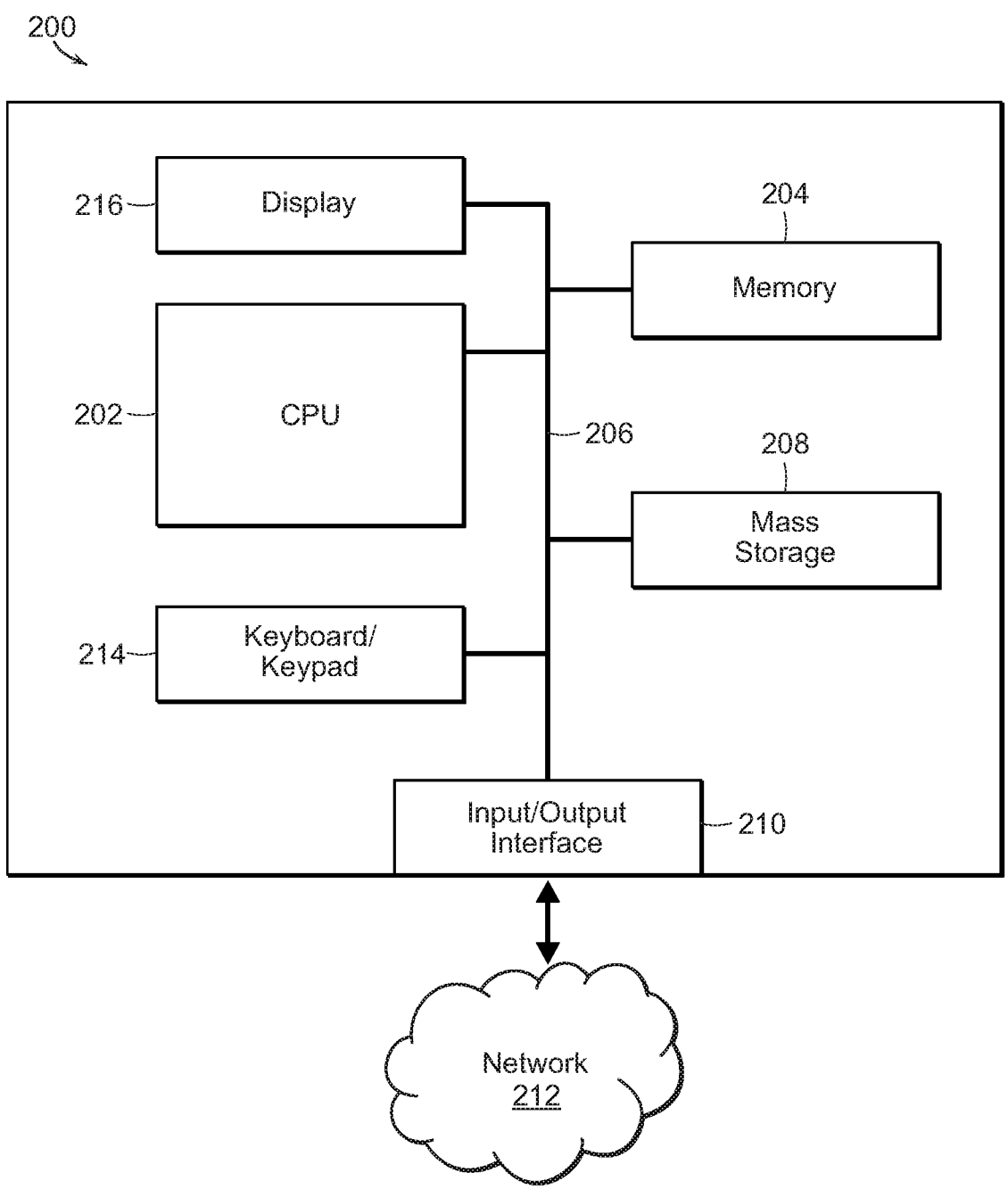
FIG. 2 shows a diagram of a computer system.

FIG. 2 includes a block diagram of a computer system 200 for performing the functions of a computer for a server such as for system 102 and/or other electronic devices such as a mobile computing device. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or memory sticks, for storing data and instructions for use by the CPU 202. At least one component of the mass storage system 208, preferably in the form of a disk drive, solid state, or tape drive, stores the database used for processing an allocation of electronic resources of the system 100. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or transceiver for data communications via the network 212 (or network 104 of FIG. 1). The data interface 210 may be a modem, an Ethernet card or any other suitable data communications device. To provide the functions of a computer 102, the data interface 210 may provide a relatively high-speed link to a network 212 (or network 104 of FIG. 1), such as an intranet, internet, or the Internet, either directly or through another external interface. The communication link to the network 212 may be, for example, optical, wired, or wireless (e.g., via satellite or cellular network). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include an entity-aware load balancing application and/or system such as described with respect to FIGS. 1, 3, and 4.

The components contained in the computer system 200 may enable the computer system to be used as a server, workstation, personal computer, network terminal, mobile computing device, mobile telephone, and the like. As discussed above, the computer system 200 may include one or more applications that enable entity-aware load balancing and/or electronic resource allocation. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or an SQL Server. The database may be supported by any suitable persistent data memory, such as a hard disk drive, RAID system, tape drive system, floppy diskette, or any other suitable system. The system 200 may include a database that is integrated with the system 200, however, it is understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 100 includes a networked-based, e.g., Internet-based, application that may be configured and run on the system 200 and/or any combination of the other components of the system 100. The system 102 and/or computer system 200 may include a web server running a Web 2.0 application or the like. Web applications running on system 102 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 102, 200 and/or 302 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 102, server 302, computer 200, or another component of system 100, 300, or 400 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, and any like public key or private key based schemes.

Figure 3:
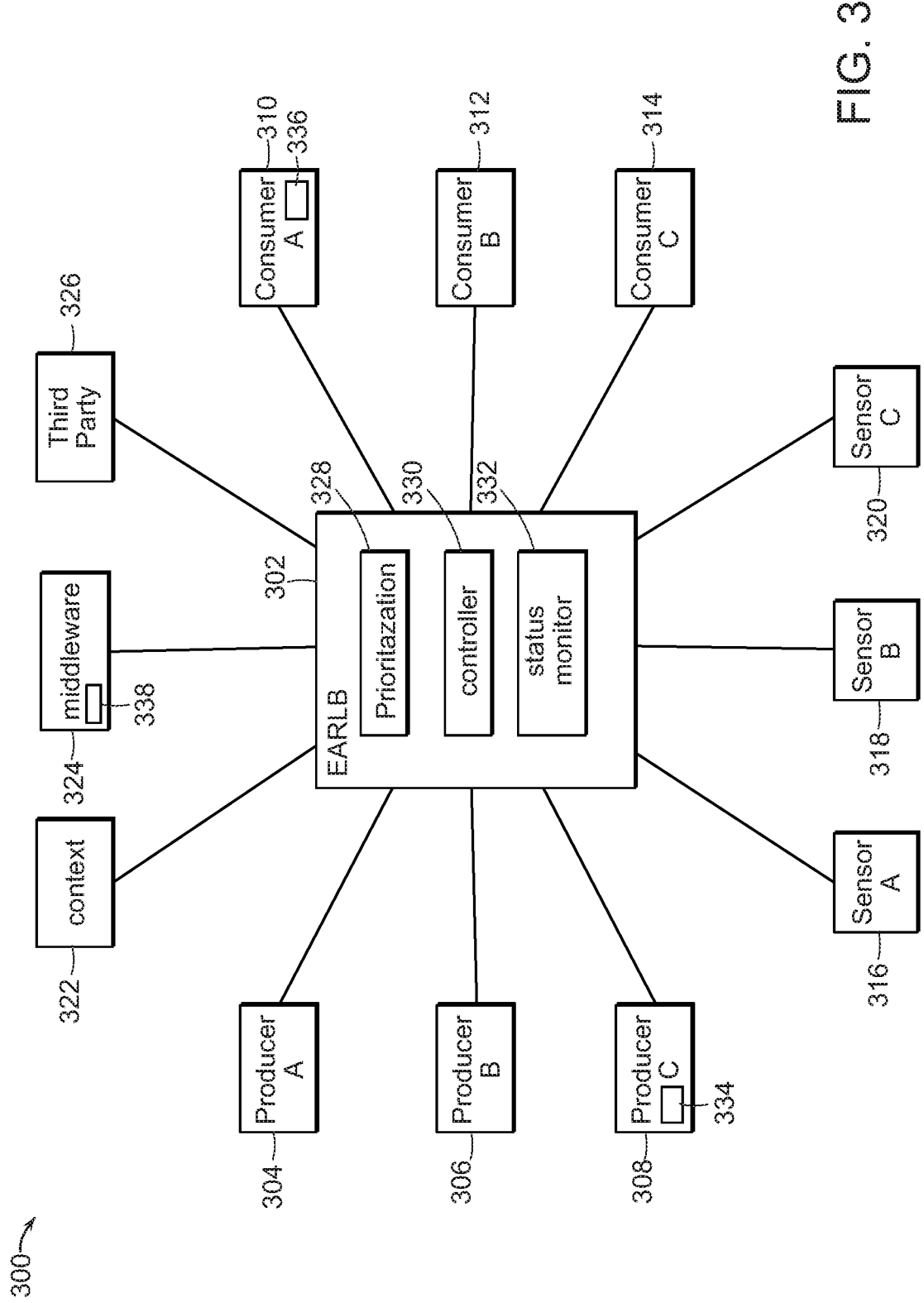
FIG. 3 shows functional diagram of an entity-aware resource load-balancing (EARLB) system including an EARLB server.

FIG. 3 shows functional diagram of an entity-aware resource load-balancing (EARLB) system 300 including an EARLB server 302. System 300 also includes resource producers 304, 306, and 308 along with resource consumer devices 310, 312, and 314. System 300 may include an operational context source 322, middleware resource 324, and a third party resource 326. The system may further include environmental sensors 316, 318, 320, 334, 336, and 338, which may include physical environmental sensors and/or cyber environmental sensors. For example, consumer device 310 may be a mobile computing device where sensor 336 is a physical environmental sensor such as a GPS receiver configured to provide location information of consumer device 310. Resource producer 308 may be a PLMN that includes a cyber environmental sensor 334 such as a network traffic analyzer. Sensor 338 may be a cyber environmental sensor such as, for example, a processor load analyzer for the middleware resource 324.

As discussed with respect to FIG. 1, context source 322 may include a database such as databases 134 and 140. The context source 322 may be local to or remote from server 302. Server 302 may retrieve operational context information from context source 322 and/or other sources such as third party source 326, which may include one or more public information sources. A public information source may include a website, news site, social media site, information site, and the like. Server 302 may scan one or more social media sources such as, for example, Twitter® or Facebook® to gather data to determine an operational context associated with consumer devices 310, 312, and 314. Such information may be used with or independently from operational context data and/or information in context source 322.

Context source 322 may include operational context information such as, without limitation, SLA, QoS requirements, historical operational settings, historical operational conditions, and consumer device settings. For example, during a pandemic, server 302 may scan various media sources to identify hot spots throughout the United States such as New York City and Chicago. Context source 322 may include context information based on recent and/or historical pandemic statistics for cities, states, and regions throughout the United States. Such information may include data related to patients, FEMA personnel, CDC personnel, US Army Corps of Engineers, National Guard, hospital personnel, first responders, available equipment, locations of hospitals, hospital bed capacity, wireless network providers in various regions, wireless network capacity, and other relevant information related to managing a pandemic response.

Server 302 may include a resource controller 330, prioritization unit 328, and/or an operational status monitor 332. Resource controller 330 may be arranged to determine an allocation of electronic resources from resource producers 304, 306, and/or 308 to consumer devices 310, 312, and/or 314. Resource controller 330 may adjust an allocation of electronic resources to certain consumer devices such as, for example, consumer device 310 based on operational context information from context source 322 and/or environmental data from, for example, sensor 336 associated with the operational status of consumer device 310. Resource controller 330 may adjust an allocation of electronic resources by directing, via a control message, middleware source 324, an intermediate server (e.g., a DMZ server, gateway server or virtual machine), and/or one or more resource producers 304, 306, and 308 to redirect and/or adjust communications to and/or from a consumer device 310, 312, and 314.

Resource controller 330 may direct a consumer device 310, 312, and 314 to direct data requests and/or communications to a failover or alternate resource producer 304, 306, and/or 308. Resource controller 330 may direct a resource producer 304, 306, and 308, via a control message, to adjust its services provided to a particular consumer device 310, 312, and 314. For example, where resource producer 304 is a PLMN, resource controller 330 may direct resource producer 304 to increase a data bandwidth capacity limit and/or provide higher priority access to consumer device 310, e.g., a mobile telephone, that is being operated by a Center for Disease Control (CDC) analyst located in a pandemic hot spot. In certain implementations, resource controller 330 automatically and/or dynamically adjusts the data bandwidth capacity and/or priority access for device 310 in real-time or near real-time based on data stored by the context source 322 related to the amount of data bandwidth capacity and need for information from CDC analysts that has been and/or is predicted to be needed. Such an implementation having a dynamically adjustable SLA and/or QoS requirements is substantially more efficient and responsive than conventional approaches using fixed SLAs or fixed QoS requirements. In certain implementations, resource controller 330 may prompt an operator for a confirmation to adjust an allocation of resources via a local interface or a remote interface such as via a user interface of consumer devices 310, 312, and/or 314.

Prioritization unit 328 may be separate or integrated with resource controller 330. Prioritization unit 328 may be arranged to determine allocation priorities for consumer devices 310, 312, and 314. Prioritization unit 328 may utilize various prioritization techniques including, without limitation, a binary sorting algorithm, pair-wise comparisons, a binary search tree, a ranking algorithm, a weighted ranking algorithm, an analytic hierarchy process (AHP), case-based ranking (CBRank), MoSCoW, Wiegers method, and/or a Kafka priority queue (e.g., priority levels for topics). As one approach, resource controller 330 may apply a weighted ranking algorithm to prioritize allocation of electronic resources to consumer devices 310, 312, and 314. Resource controller 330 may consider device location (weight=0.5), device operator role (weight=0.7), and a value for an electronic resource (weight=1.0). The device location may have a score of 1-10 depending on the device proximity to a pandemic hot spot, e.g., a device detected in a hot spot may be assigned a score of 10. The device operator role may have a score of 1-10 based on importance of role, e.g., a FEMA director may have a score of 8. The value of an electronic resource may have a range of 1-10, e.g., available beds in hospitals in a region may have a score of 6. These values may dynamically change based on operational context information stored in context source 322. Based on the example weights and scores, a consumer device, e.g., consumer device 310, operated by a FEMA director located in a pandemic hot spot that is requesting data about available hospital beds would have a total score of 10(0.5)+8(0.7)+6(1.0)=16.6. Hence, consumer device 310 would have priority over other consumer devices having a lower priority score with respect to an allocation of resources from one or more resource producers 304, 306, and 308.

Prioritization unit 328 may use a Kafka topic priority scheme where, for example, one or a combination of consumer device location, consumer device operator role, and the value of certain electronic resources are assigned different priority rankings to determine allocation priorities of consumer devices 310, 312, and 314. The topic or topics used for prioritization may vary and may be adjusted dynamically based on operational context information. Kafka is a distributed messaging scheme that enables fast, scalable, and redundant messaging using a pub-sub model. Kafka is highly available and resilient to node failure and enables automatic recovery of nodes. Kafka messages are organized into topics. Messages are sent to a specified topic and read from the specified topic. A resource consumer pulls messages from a Kafka topic while a resource producer pushes messages into a Kafka topic. In some implementations, server 302 includes a Kafka distributed messaging scheme. Kafka is a distributed scheme that runs in a cluster where each node in the cluster is referred to as a Kafka broker. Kafka topics may be divided into multiple partitions that enable a topic to be parallelized by splitting the electronic data associated with a topic across multiple brokers. Each partition may be implemented on a separate server or virtual machine to enable multiple resource consumers to read from a topic in parallel, which enables a very high message processing throughput. Each message in a partition has an identifier referred to as an offset. Each message in a Kafka cluster can be uniquely identified by a tuple including the message topic, partition, and offset within a partition. A partition may be considered a log where a resource consumer can read from the log at any point in time. Each Kafka broker has multiple partitions where each partition may be a leader or a replica for a topic. All reads and writes to a topic are initially made to a leader who then updates the replicas. If a leader fails, a replica takes over as the leader. Resource producers write to a single leader which enables load balancing of data by allowing each write to be serviced by a separate broker and virtual machine and/or server. In an implementation where there are three brokers, one broker will have a leader partition and the other two brokers will have replica partitions which enables automatic failovers if one or two of the partitions fails. In certain implementations, server 302 uses Kafka flow control with topic pausing and Kafka manual performance monitoring for data messaging. Server 302 may additionally or alternatively utilize various other load balancing schemes such as, without limitation, round robin, weighted round robin, random, source IP hash, URL hash, least connections, weighted least connections, agent-based adaptive load balancing, weighted response time, layer 7 content switching, active directory group based traffic steering, and Kafka auto load balancing.

Status monitor 332 may be separate or integrated with resource controller 330. Status monitor 332 may interface with one or more of environmental sensors 316, 318, 320, 334, 336, and 338. Environmental sensors 316, 318, and 320 may be located physically and/or logically anywhere in the cloud and/or network 104. Status monitor 332 may periodically, or in response to an event, receive operational status information from sensors 316, 318, 320, 334, 336, and 338. Each sensor 316, 318, 320, 334, 336, and 338 may send a periodic heartbeat message indicating that a network entity (e.g., a resource produce, middleware source, consumer device, and so on), network, application, service, is available and/or has not be compromised from a security perspective. Status monitor 332 may request operational status information from a sensor 316, 318, 320, 334, 336, and 338 via a request message. A device or entity may be a resource producer in one instance while producing and/or providing electronic resources such as data to another entity or the device may be a resource consumer at another instance while consuming and/or receiving electronic resources such as data from another entity or device. For example, mobile computing device 114 may function as a resource consumer while running a web browser client that is accessing a website provided by a web server running on a resource producer 106 server. Mobile computing device 114 may also function concurrently as a resource producer by, for example, providing location data or other data to one or more servers or other entities that may be part of producers 106, 108, 110, and 128 that are acting as resource consumers with respect to mobile computing device 114 for the purpose of obtaining its location data or other data.

Figure 4:
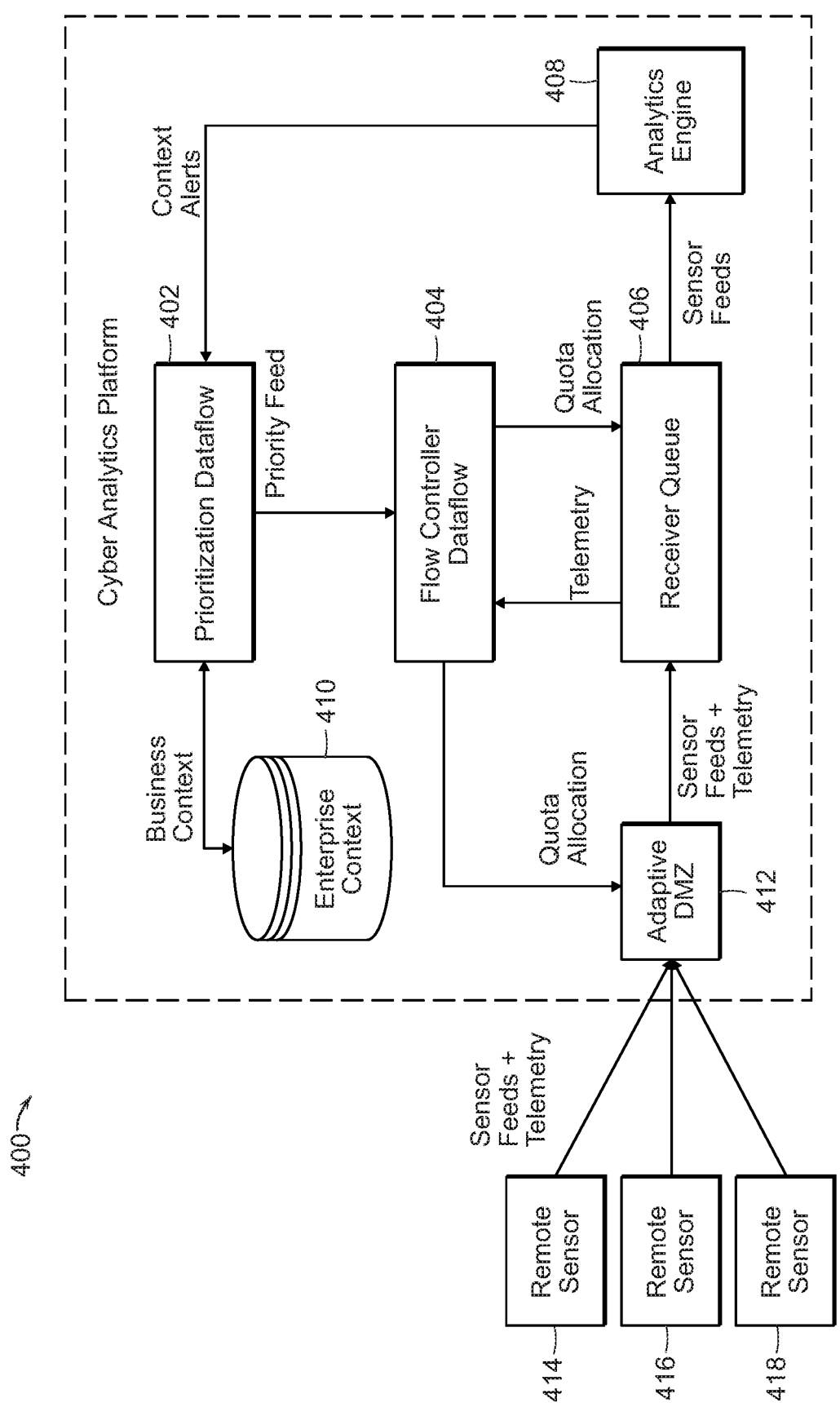
FIG. 4 shows a detailed diagram of an exemplary cyber analytics platform including EARLB processing.

FIG. 4 shows a detailed diagram of an exemplary cyber analytics platform system 400 including EARLB processing. In some implementations, system 400 uses Kafka and/or NiagaraFiles (NiFi) flow control with topic pausing, NiFi prioritization and Kafka manual performance monitoring for data messaging. System 400 includes a prioritization dataflow unit 402 (e.g., NiFi), flow controller dataflow unit 404 (e.g., NiFi), a receiver queue 406 (Kafka), an analytics engine 408, an enterprise and/or operational context database 410, an adaptive DMZ 412, and remote environmental sensors 414, 416, and 418. In some implementations, system 400 provides real-time or near real-time allocation adjustments of electronic resources to multiple consumer devices such as devices 310, 312, and 314.

In operation, remote sensors 414, 416, and 418 provide sensor data feeds and telemetry data to system 400 via adaptive DMZ 412. Adaptive DMZ 412 may include one or more servers and/or one or more virtual machines. Adaptive DMZ 412 may include multiple Kafka brokers handling multiple topic partitions. Receive queue 406 may receive sensor feed data and telemetry data. Sensor feed data may include operational status information associated with one or more consumer devices such as devices 310, 312, and 314. Analytics engine 408 may receive the sensor feed data and generate operational context alerts that are sent to prioritization dataflow unit 402. Prioritization dataflow unit 402 may also access operational context information in database 410, databases 134 and 140, and/or context source 322. Based on the operational context information from database 410 and the operational context alerts from analytics engine 408, prioritization dataflow unit 402 sends a priority feed to flow controller dataflow unit 404. Server 302 may include various elements of system 400 such as prioritization dataflow unit 402, flow controller dataflow unit 404, receiver queue 406, analytics engine 408, database 410, and adaptive DMZ 412.

Flow controller dataflow unit 404 may receive the priority feed from unit 402 and telemetry data from receiver queue 406 and output a quota allocation to the adaptive DMZ 412 and receiver queue 406. Adaptive DMZ 412 may adjust and/or configure an allocation of data and/or electronic resources based on the quota allocation data from flow controller dataflow unit 404 to one or more consumer devices such as devices 310, 312, and 314. Prioritization dataflow unit 402 may update operational context database 410 based on operational context alerts received from analytics engine 408. By utilizing operational context information from database 410 and operational status information and/or operational context alerts from analytics engine 408, system 400 is able to dynamically adjust prioritization and allocation quotas of data and/or electronic resources based on consumer and/or client device operational status, i.e., adjust allocation of resources dynamically in an entity-aware manner.

Figure 5:
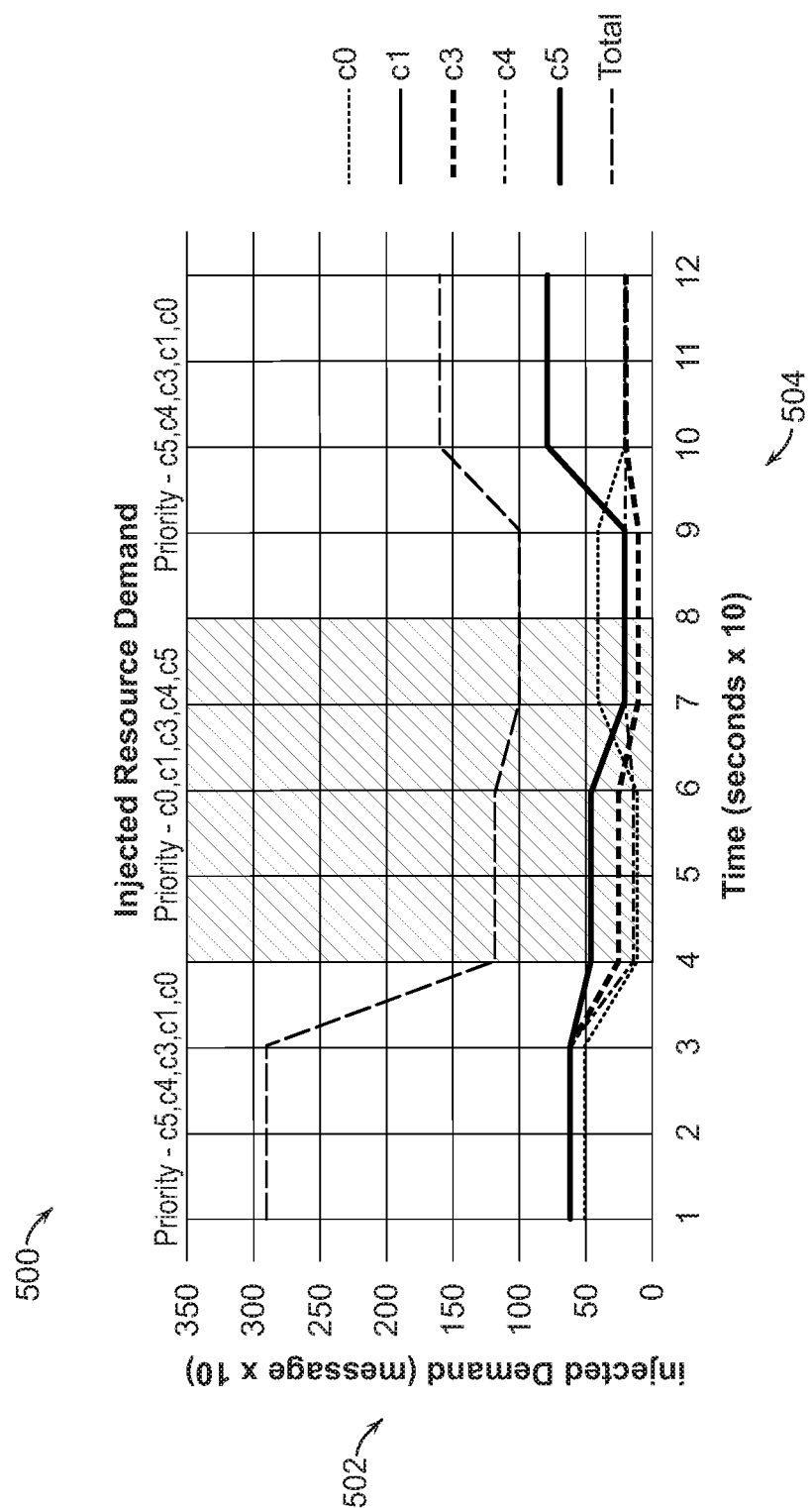
FIG. 5 is a graph showing a simulated consumer resource demand with respect to time and changing consumer priorities.

FIG. 5 is a graph 500 showing resource demand 502 with respect to time 504 for a data traffic simulation of a system such as system 400 while handling two (2) minutes of data traffic for five consumers c0, c1, c3, c4, and c5 as shown in Table 1 below. The x-axis 504 shows a time of (10 seconds)×(x-axis value). The y-axis 502 shows a resource demand of (10 messages)×(y-axis value). For example, at 30 seconds consumer c0 has a resource demand of 500 messages while consumers c1, c3, c4, and c5 have a resource demand of 600 messages. Table 1 also shows changing operational priorities for consumers c0, c1, c3, c4, and c5. In this simulation, the priority ranking starts at c5, c4, c3, c1, c0 (highest priority listed first), changes to c0, c1, c3, c4, c5 at 40 seconds, and changes back to c5, c4, c3, c1, c0 at 80 seconds.

TABLE 1

Injected Resource Demand

| | Priority | | | | | | | | | | | |
|---|---|---|---|---|---|---|---|---|---|---|---|---|
| | c5, c4, c3, c1, c0 | | | c0, c1, c3, c4, c5 | | | c5, c4, c3, c1, c0 | | | | | |
| | Time (seconds × 10) | | | | | | | | | | | |
| | 1 | 2 | 3 | 4 | 5 | 6 | 7 | 8 | 9 | 10 | 11 | 12 |
| Consumer | Injected Resource Demand (messages × 10) | | | | | | | | | | | |
| c0 | 50 | 50 | 50 | 10 | 10 | 10 | 40 | 40 | 40 | 20 | 20 | 20 |
| c1 | 60 | 60 | 60 | 25 | 25 | 25 | 10 | 10 | 10 | 20 | 20 | 20 |
| c3 | 60 | 60 | 60 | 25 | 25 | 25 | 10 | 10 | 10 | 20 | 20 | 20 |
| c4 | 60 | 60 | 60 | 15 | 15 | 15 | 20 | 20 | 20 | 20 | 20 | 20 |
| c5 | 60 | 60 | 60 | 45 | 45 | 45 | 20 | 20 | 20 | 80 | 80 | 80 |
| Total | 290 | 290 | 290 | 120 | 120 | 120 | 100 | 100 | 100 | 160 | 160 | 160 |

Figure 6:
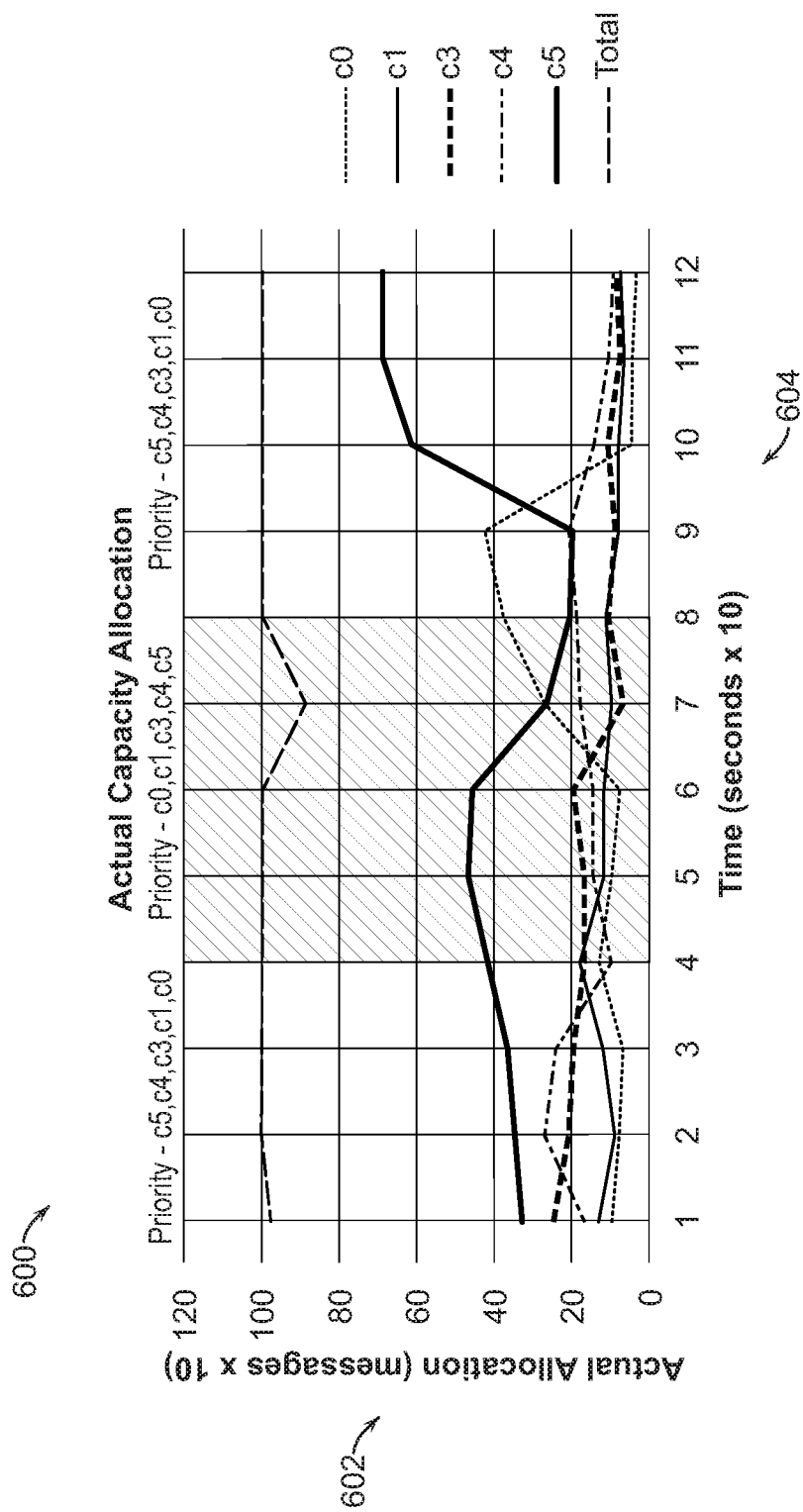
FIG. 6 is a graph showing actual capacity allocation with respect to time and changing consumer priorities.

FIG. 6 is a graph 600 showing actual allocation 602 with respect to time 604 for the five consumers c0, c1, c3, c4, and c5 with values as shown in Table 2 below, which corresponds to the time and changing consumer priorities in FIG. 5. The y-axis resource allocation 602 shows a discrete message count of (10 messages)×(y-axis value). For example, at 30 seconds consumer c0 has a resource demand of 500 messages (FIG. 5) with an allocation of 70 messages, consumers c1, c3, c4, and c5 have a resource demand of 600 messages with an allocation of 120, 200, 240, and 370 messages respectively. Note for the simulation the total capacity has a built in quota or limit of 1000 messages.

TABLE 2

Actual Capacity Allocation

| | Priority | | | | | | | | | | | |
|---|---|---|---|---|---|---|---|---|---|---|---|---|
| | c5, c4, c3, c1, c0 | | | | c0, c1, c3, c4, c5 | | | | c5, c4, c3, c1, c0 | | | |
| | Time (seconds × 10) | | | | | | | | | | | |
| | 1 | 2 | 3 | 4 | 5 | 6 | 7 | 8 | 9 | 10 | 11 | 12 |
| Consumer | Actual Capacity Allocation (messages × 10) | | | | | | | | | | | |
| c0 | 10 | 8 | 7 | 13 | 10 | 8 | 27 | 38 | 42 | 5 | 5 | 4 |
| c1 | 13 | 9 | 12 | 18 | 12 | 12 | 10 | 11 | 8 | 8 | 7 | 8 |
| c3 | 25 | 21 | 20 | 17 | 17 | 20 | 7 | 11 | 9 | 11 | 8 | 9 |
| c4 | 17 | 27 | 24 | 10 | 14 | 14 | 18 | 19 | 21 | 15 | 11 | 10 |
| c5 | 33 | 35 | 37 | 42 | 47 | 46 | 27 | 21 | 20 | 61 | 69 | 69 |
| Total | 98 | 100 | 100 | 100 | 100 | 100 | 89 | 100 | 100 | 100 | 100 | 100 |

Figure 7:
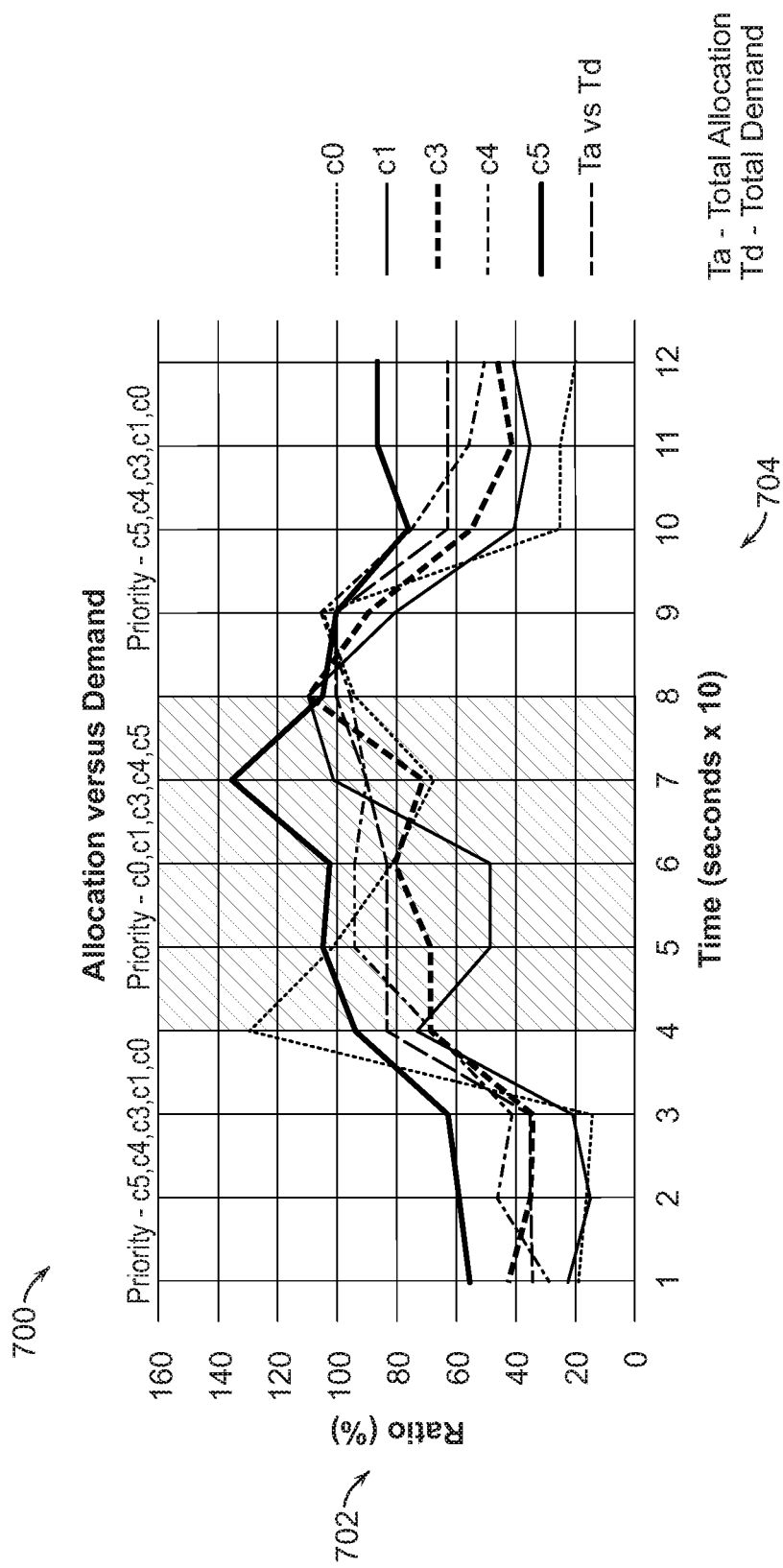
FIG. 7 is a graph illustrating the ratio of the allocation to demand over time and changing consumer priorities with respect to the graphs of FIGS. 5 and 6.

FIG. 7 is graph 700 illustrating the ratio 702 of the actual allocation to demand over time 704 for the five consumers c0, c1, c3, c4, and c5 with values as shown in Table 3 below, which corresponds to the times 504 and 604 in FIGS. 5 and 6. A ratio of less than 100% indicates a decrease with respect to a consumer's demand, equal to 100% indicates no change with respect to a consumer's demand, and greater than 100% indicates an increase with respect to a consumers demand. FIG. 7 illustrates that no consumer c0, c1, c3, c4, or c5 data stream was starved due to strict adherence to defined SLA or QoS static quota allocations (i.e., no consumer evidenced a 0% allocation). This demonstrates that system 400 considered each consumer's dynamic criticality (i.e., priority) to effectively stay within the aggregate 1000 message quota.

TABLE 3

Ratio of Allocation to Demand

| | Priority | | | | | | | | | | | |
|---|---|---|---|---|---|---|---|---|---|---|---|---|
| | c5, c4, c3, c1, c0 | | | | c0, c1, c3, c4, c5 | | | | c5, c4, c3, c1, c0 | | | |
| | Time (seconds × 10) | | | | | | | | | | | |
| | 1 | 2 | 3 | 4 | 5 | 6 | 7 | 8 | 9 | 10 | 11 | 12 |
| Consumer | Ratio of Allocation to Demand (%) | | | | | | | | | | | |
| c0 | 20 | 16 | 14 | 130 | 100 | 80 | 68 | 95 | 105 | 25 | 25 | 20 |
| c1 | 22 | 15 | 20 | 72 | 48 | 48 | 100 | 110 | 80 | 40 | 35 | 40 |
| c3 | 42 | 35 | 33 | 68 | 68 | 80 | 70 | 110 | 90 | 55 | 40 | 45 |
| c4 | 28 | 45 | 40 | 67 | 93 | 93 | 90 | 95 | 105 | 75 | 55 | 50 |
| c5 | 55 | 58 | 62 | 93 | 104 | 102 | 135 | 105 | 100 | 76 | 86 | 86 |
| Ta vs Td | 34 | 34 | 34 | 83 | 83 | 83 | 89 | 100 | 100 | 63 | 63 | 63 |

Figure 8:
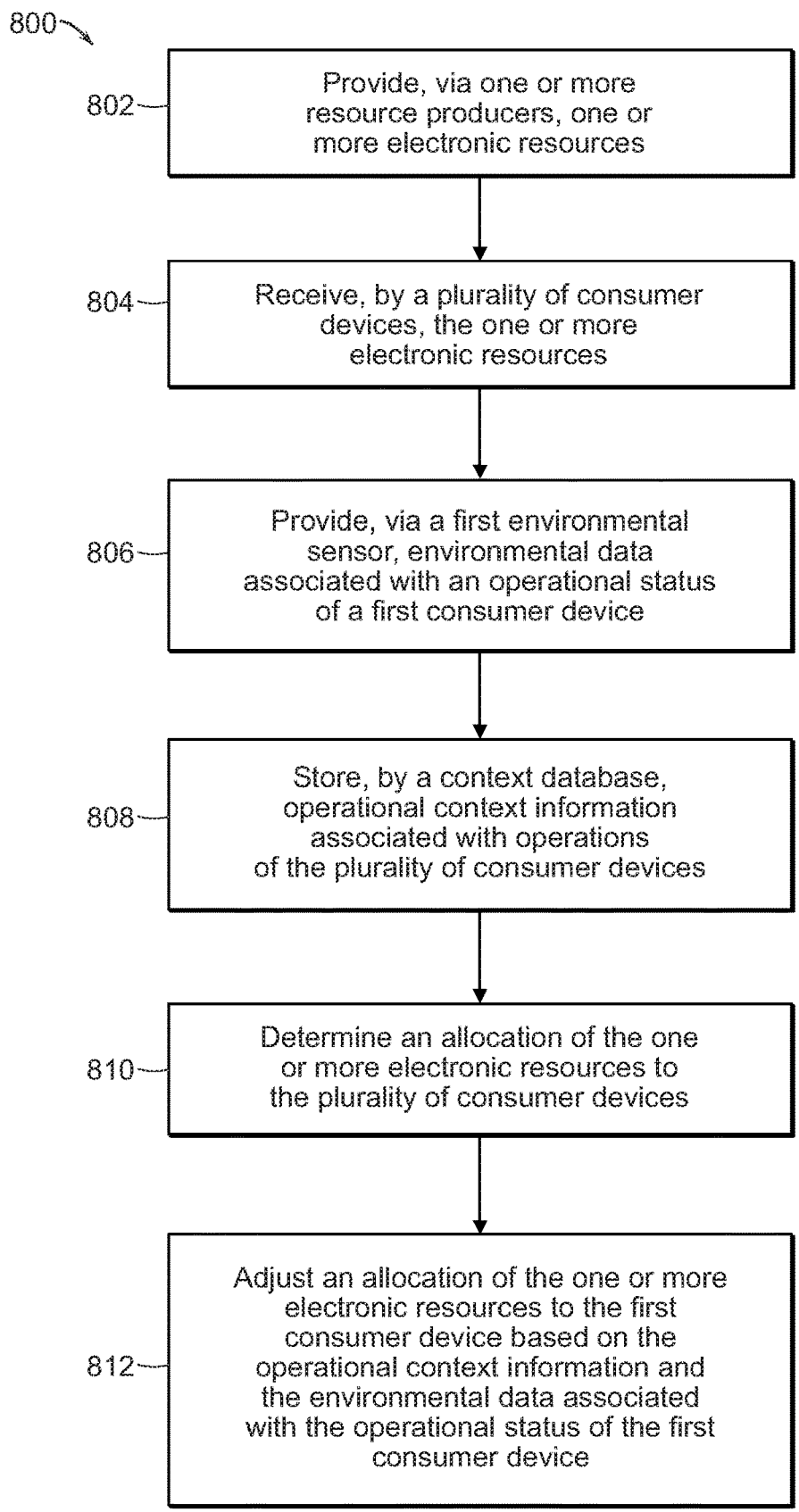
FIG. 8 is an exemplary process for allocating resources.

FIG. 8 is an exemplary process 800 for allocating electronic resources. Process 800 includes: providing, via one or more resource producers 304, 306, and 308, one or more electronic resources (Step 802); receiving, by a plurality of consumer devices 310, 312, and 314, the one or more electronic resources (Step 804); providing, via a first environmental sensor 336, environmental data associated with an operational status of a first consumer device 310 of the plurality of consumer devices 310, 312, and 314 (Step 806); storing, by a context database 322, operational context information associated with operations of the plurality of consumer devices 310, 312, and 314 (Step 808); determining an allocation of the one or more electronic resources to the plurality of consumer devices 310, 312, and 312 (Step 810); and adjusting an allocation of the one or more electronic resources to the first consumer device 310 based on the operational context information and the environmental data associated with the operational status of the first consumer device 310 (Step 812).

In some implementations, a mobile computing device, such as device 114, includes a transceiver 210 arranged to: i) send and receive data communications via a data network 104 or 212 and ii) periodically send operational status data to a remote resource controller 330, the operational status data including at least one of key performance indicators and an alert message. The mobile computing device 114 may include a data store 208 arranged to store at least one of service level agreement data and quality of service data associated with the operation of the mobile computing device 114. The mobile computing device may also include a processor 202 arranged to: i) monitor the operational status of at least one of the mobile computing device 114 and the operational status of the data network 104 and/or 212, ii) determine a threshold level of quality of service based on the at least one of the service level agreement data and the quality of service data, iii) compare a level of the operational status of at least one of the mobile computing device 114 and the data network 104 and/or 212 with the threshold level of quality of service and, if the level of the operational status is below the threshold level of quality of service, generate the alert message including an indication to the remote resource controller 330 to adjust an allocation of electronic resources to the mobile computing device 114 to alleviate the alert condition. The mobile computing device 114 may include a user interface 214 configure to enable a user to input a request to adjust a resource allocation to resource controller 330.

It will be apparent to those of ordinary skill in the art that certain aspects involved in the operation of the system 102, server 302, system 400 and other servers or devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A resource allocation system comprising:
    one or more resource producers arranged to provide one or more electronic resources;
    a plurality of consumer devices arranged to receive the one or more electronic resources;
    a first environmental sensor arranged to detect and provide environmental data associated with an operational status of a first consumer device of the plurality of consumer devices;
    a second environmental sensor arranged to detect and provide environment data associated with an operational status of the one or more resource producers;
    a context database arranged to store operational context information associated with operations of the plurality of consumer devices;
    an intermediate electronic resource arranged to receive the one or more electronic resources from the one or more resource producers and send the one or more electronic resources to the first consumer device, the intermediate electronic resource including a middleware server arranged to provide a middleware service to the first consumer device; and
    a resource controller arranged to determine an allocation of the one or more electronic resources to the plurality of consumer devices and further arranged to adjust an allocation of the one or more electronic resources to the first consumer device based on the operational context information, the environmental data associated with the operational status of the first consumer device, and the environmental data associated with the operational status of the one or more resource producers.

2. The system of claim 1, wherein the first consumer device includes a user interface arranged to receive an operational setting from an operator of the first consumer device.

3. The system of claim 2, wherein the resource controller adjusts the allocation of the one or more electronic resources to the first consumer device based further on the operational setting.

4. The system of claim 1, wherein the first environment sensor includes one of a physical environmental sensor and a cyber environmental sensor.

5. The system of claim 4, wherein the physical environmental sensor is arranged to detect at least one of temperature, moisture, pressure, position, movement, location, orientation, wind velocity, smoke, depth, and altitude.

6. The system of claim 4, wherein the cyber environmental sensor includes at least one of a network data monitor, protocol analyzer, virus detector, intrusion detector, firewall, router, network traffic monitor, processor utilization monitor, heartbeat sensor, and a network operations center.

7. The system of claim 1, wherein the resource controller adjusts the allocation of resources from among the one or more resource producers to the first consumer device based further on the operational status of the one or more resource producers.

8. The system of claim 1, wherein the first environmental sensor is integrated with the first consumer device.

9. The system of claim 1, wherein the first environmental sensor is remote from the first consumer device.

10. The system of claim 1, wherein at least one resource producer of the one or more resource producers is configured to periodically send a message to the resource controller indicating an operational status of the resource producer.

11. The system of claim 1 comprising a second consumer device, wherein the first environmental sensor detects and provides environmental data associated with the operational status of the second consumer device.

12. The system of claim 11, wherein the resource controller adjusts an allocation of the one or more electronic resources to the first consumer device and second consumer device based further on operational context information and an operational status of the second consumer device.

13. The system of claim 1, wherein the second environmental sensor is arranged to detect and provide data associated with an operational status of the intermediate electronic resource.

14. The system of claim 13, wherein the resource controller adjusts the allocation of resources from among the one or more resource producers to the first consumer device via the intermediate electronic resource based further on the operational status of the intermediate electronic resource.

15. The system of claim 1, wherein the one or more electronic resources includes multimedia files, data files, video files, audio files, media streams, audio streams, data streams, data channels, media channels, video channels, audio channels, communications interfaces, communications channels, an information database, a media database, broadcast data, broadcast data bandwidth, communications services, communications channel capacity, an amount of communications channels, communications bandwidth, media data services, producer processing power, and intermediate electronic resource processing power.

16. The system of claim 1, wherein the environmental data includes telemetry data.

17. The system of claim 1, wherein the middleware server includes at least one of a web server and an application server.

18. A resource allocation server comprising:
    a transceiver arranged to: i) receive, from a first environmental sensor, environmental data associated with an operational status of a first consumer device, ii) receive, from a second environmental sensor, environmental data associated with an operational status of one or more resource producers iii) receive operational context information associated with a plurality of consumer devices including the first consumer device, and iv) send a control message to at least one intermediate server based on a determined allocation of electronic resources to configure an allocation of electronic resources from the one or more resource producers to the first consumer device via the at least one intermediate server, wherein the intermediate server includes a middleware server arranged to provide a middleware service to the first consumer device; and a resource controller arranged to determine the allocation of the electronic resources to the first consumer device based on the operational context information and the environmental data associated with the operational status of the first consumer device and the environmental data associated with the operational status of the one or more resource producers.

19. A mobile computing device comprising:

a transceiver arranged to: i) send and receive data communications via a data network to and from a middleware server and ii) periodically send operational status data to a remote resource controller, the operational status data including at least one of key performance indicators and an alert message, wherein the data communications is associated with a middleware service provided by the middleware server;

a data store arranged to store at least one of service level agreement data and quality of service data associated with the operation of the mobile computing device; and a processor arranged to: i) monitor the operational status of at least one of the mobile computing device and the operational status of the middleware server of the data network, ii) determine a threshold level of quality of service based on the at least one of the service level agreement data and the quality of service data, iii) compare a level of the operational status of at least one of the mobile computing device and the middleware server of the data network with the threshold level of quality of service and, if the level of the operational status is below the threshold level of quality of service, generate the alert message including an indication to the remote resource controller to adjust an allocation of electronic resources to the mobile computing device to alleviate the alert condition.

* * * * *